(12) United States Patent
Oohashi

(10) Patent No.: US 9,248,846 B2
(45) Date of Patent: Feb. 2, 2016

(54) ROLLING STOCK

(75) Inventor: Kengo Oohashi, Nagoya (JP)

(73) Assignee: Nippon Sharyo, Ltd., Nagoya-shi (JP)

( * ) Notice: Subject to any disclaimer, the term of this patent is extended or adjusted under 35 U.S.C. 154(b) by 58 days.

(21) Appl. No.: 14/361,055

(22) PCT Filed: Dec. 2, 2011

(86) PCT No.: PCT/JP2011/077892
§ 371 (c)(1),
(2), (4) Date: Oct. 1, 2014

(87) PCT Pub. No.: WO2013/080367
PCT Pub. Date: Jun. 6, 2013

(65) Prior Publication Data
US 2015/0040792 A1    Feb. 12, 2015

(51) Int. Cl.
*B61D 17/00* (2006.01)
*B61D 15/06* (2006.01)
*B61D 17/04* (2006.01)
*B61D 17/08* (2006.01)
*B61F 1/02* (2006.01)
*B61F 1/10* (2006.01)
*B61C 17/04* (2006.01)
(Continued)

(52) U.S. Cl.
CPC ............... *B61D 15/06* (2013.01); *B61C 17/04* (2013.01); *B61D 17/02* (2013.01); *B61D 17/04* (2013.01); *B61D 17/08* (2013.01); *B61D 25/00* (2013.01); *B61F 1/02* (2013.01); *B61F 1/10* (2013.01); *Y02T 30/34* (2013.01)

(58) Field of Classification Search
CPC ................ B61D 15/06; B61D 17/02–17/08; B61F 1/02; B61F 1/10
See application file for complete search history.

(56) References Cited

U.S. PATENT DOCUMENTS

| 2,257,084 A * | 9/1941 | Dean ............... B61D 17/06 105/402 |
| 2003/0056683 A1 * | 3/2003 | Yamaguchi ........... B61D 15/06 105/75 |

(Continued)

FOREIGN PATENT DOCUMENTS

| DE | 19852518 A1 | 5/2000 |
| JP | 2001-048016 A | 2/2001 |

(Continued)

OTHER PUBLICATIONS

International Search Report mailed Feb. 28, 2012, issued for PCT/JP2011/077892.

*Primary Examiner* — Jason C Smith
(74) *Attorney, Agent, or Firm* — Locke Lord LLP

(57) ABSTRACT

Provided is a rolling stock including: an upper reinforcement beam provided in a railroad-tie direction in a joint portion between an upper end portion of a cab end structure and an upper end portion of a side structure; and a post member coupling the upper reinforcement beam and an end beam of an underframe, in which the post member includes: a lower post portion having a lower end joined to the end beam; an upper post portion having a rear end joined to the upper reinforcement beam; and a window opening post portion provided between the lower post portion and the upper post portion in conformity with an inclination of a front window provided in a cab end structure, the window opening post portion is formed to have a smaller width dimension in a rail direction than a width dimension of the lower post portion in the rail direction.

8 Claims, 15 Drawing Sheets

(51) Int. Cl.
   *B61D 17/02*     (2006.01)
   *B61D 25/00*     (2006.01)

(56)          References Cited

U.S. PATENT DOCUMENTS

| | | | |
|---|---|---|---|
| 2004/0040463 A1* | 3/2004 | Yamamoto | B61D 15/06 105/396 |
| 2007/0214996 A1* | 9/2007 | Nedelik | B61D 17/06 105/238.1 |
| 2007/0261591 A1* | 11/2007 | Bravo | B61C 17/04 105/392.5 |
| 2007/0283843 A1* | 12/2007 | Kawasaki | B61D 17/06 105/396 |
| 2008/0250965 A1* | 10/2008 | Clark | B61D 15/06 105/413 |
| 2008/0314282 A1* | 12/2008 | Malfent | B61D 15/06 105/392.5 |
| 2009/0283009 A1 | 11/2009 | Bravo et al. | |
| 2012/0097066 A1* | 4/2012 | Matsuoka | B61D 15/06 105/342 |
| 2012/0125225 A1* | 5/2012 | Matsuoka | B61D 15/06 105/396 |
| 2012/0325108 A1* | 12/2012 | Graf | B61F 1/10 105/392.5 |
| 2013/0098264 A1* | 4/2013 | Kuroda | B61D 15/06 105/392.5 |
| 2013/0104770 A1* | 5/2013 | Nakao | B61D 15/06 105/392.5 |
| 2013/0125782 A1* | 5/2013 | Ishizuka | B61D 15/06 105/392.5 |
| 2013/0239847 A1* | 9/2013 | Taguchi | B61D 17/06 105/392.5 |
| 2015/0020709 A1* | 1/2015 | Hayashi | B61F 1/08 105/413 |
| 2015/0033978 A1* | 2/2015 | Oohashi | B61D 17/06 105/1.1 |
| 2015/0040792 A1* | 2/2015 | Oohashi | B61D 17/04 105/1.1 |
| 2015/0040793 A1* | 2/2015 | Nakao | B61D 17/06 105/1.1 |
| 2015/0191180 A1* | 7/2015 | Langert | B61D 17/00 105/456 |

FOREIGN PATENT DOCUMENTS

| | | |
|---|---|---|
| JP | 2002-302036 A | 10/2002 |
| JP | 2003-095097 A | 4/2003 |
| JP | 2004-090825 A | 3/2004 |
| JP | 2011-235728 A | 11/2011 |
| JP | 2011-235733 A | 11/2011 |

\* cited by examiner

ROLLING STOCK

TECHNICAL FIELD

The present invention relates to a rolling stock, and relates specifically to a construction of a cab end structure in a rolling stock having a streamlined head shape.

BACKGROUND ART

A car body of a rolling stock is formed by joining side structures and end structures to four side portions of an underframe, then joining a roof structure to upper portions of the side structures and the end structures, and attaching outside plates, floor plates, interior decorative members, doors, windows, and the like to the structures. In the conventional rolling stock, a passenger compartment is protected by reinforcing the end structures and the underframe portions or by providing impact absorbing members, as collision countermeasures (see for example Patent Document 1).

PRIOR ART DOCUMENT

Patent Document

Patent Document 1: Japanese Patent Application Publication No. 2001-48016

SUMMARY OF THE INVENTION

Problem to be Solved by the Invention

In the case of a general flat-shaped end structure, the strength of the end structure is improved by thickening the posts or by providing reinforcement members. However, in the case of a cab end structure of a rolling stock in which one of the end structures is formed in a streamlined shape, since the cab end structure is provided with a driver's cabin, there is a problem that thickening the posts or providing reinforcement members may obstruct the driver's view.

Accordingly, an object of the present invention is to provide a rolling stock including a construction capable of improving the strength of a cab end structure formed in a streamlined shape without obstructing the driver's view.

Means for Solving the Problem

To achieve the above-described object, a rolling stock of the present invention is a rolling stock having a car body formed by joining a cab end structure having a streamlined shape and an end structure respectively to opposite ends of an underframe, side structures, and a roof structure, the rolling stock including: an upper reinforcement beam provided in a railroad-tie direction between joint portions of an upper end portion of the cab end structure and upper end portions of the side structures; and post members coupling the upper reinforcement beam and an end beam of the underframe, in which each of the post members includes: a lower post portion having a lower end joined to a reinforcement post provided on the end beam; an upper post portion having a rear end joined to the upper reinforcement beam; and a window opening post portion provided between an upper end portion of the lower post portion and a lower end portion of the upper post portion in an inclined manner to conform to an inclination of a front window provided in the cab end structure, the reinforcement post and the lower post portion are formed from plate materials having the same thickness, the window opening post portion is formed by laminating two plate materials having the same thickness as that of the reinforcement post and the lower post portion, and the window opening post portion is formed to have a smaller width dimension in a rail direction than a width dimension of the lower post portion in the rail direction.

Moreover, the rolling stock of the present invention is characterized in that each post member is formed from a solid member, in that the cab end structure is provided with a driver's cabin in a center portion in a width direction of the car body, and is provided with a pair of corner posts respectively in opposite end portions in the width direction of the car body, and the post members are a pair of end posts provided in opposite side portions of the driver's cabin, and on inner sides of the car body relative to the corner posts, and in that each post member has a lower end portion joined to a front face of the end beam and has an upper end portion joined to a front face of the upper reinforcement beam.

Effect of the Invention

According to the rolling stock of the present invention, since the window opening post portion, which is disposed in conformity with the inclination of the front window formed in a streamlined shape, is formed to have a smaller width dimension in the rail direction than that of the lower post portion, the driver's view is not obstructed. In addition, forming each post member from a solid material makes it possible to obtain a sufficient strength even with reduced cross-sectional dimensions. In particular, in the case where the driver's cabin is provided in the center portion of the cab end structure in the width direction of the car body, since the window opening post portions each having a small width dimension in the rail direction are located on the opposite sides of the driver's cabin, it is possible to achieve a favorable state of the front view of the driver. Moreover, the pair of post members are disposed on the inner sides of the pair of corner posts on the opposite ends in the width direction of the car body. This makes it possible to enhance the rigidity of the cab end structure. Further, the lower end portion and the upper end portion of each post member are joined to the front face of the end beam and the front face of the upper reinforcement beam, respectively. This makes it possible to receive external force applied to the post members from the front side by means of the end beam and the upper reinforcement beam through the post members, and thus makes it possible to improve the strength of the cab end structure.

MODES FOR CARRYING OUT THE INVENTION

Figure 1:
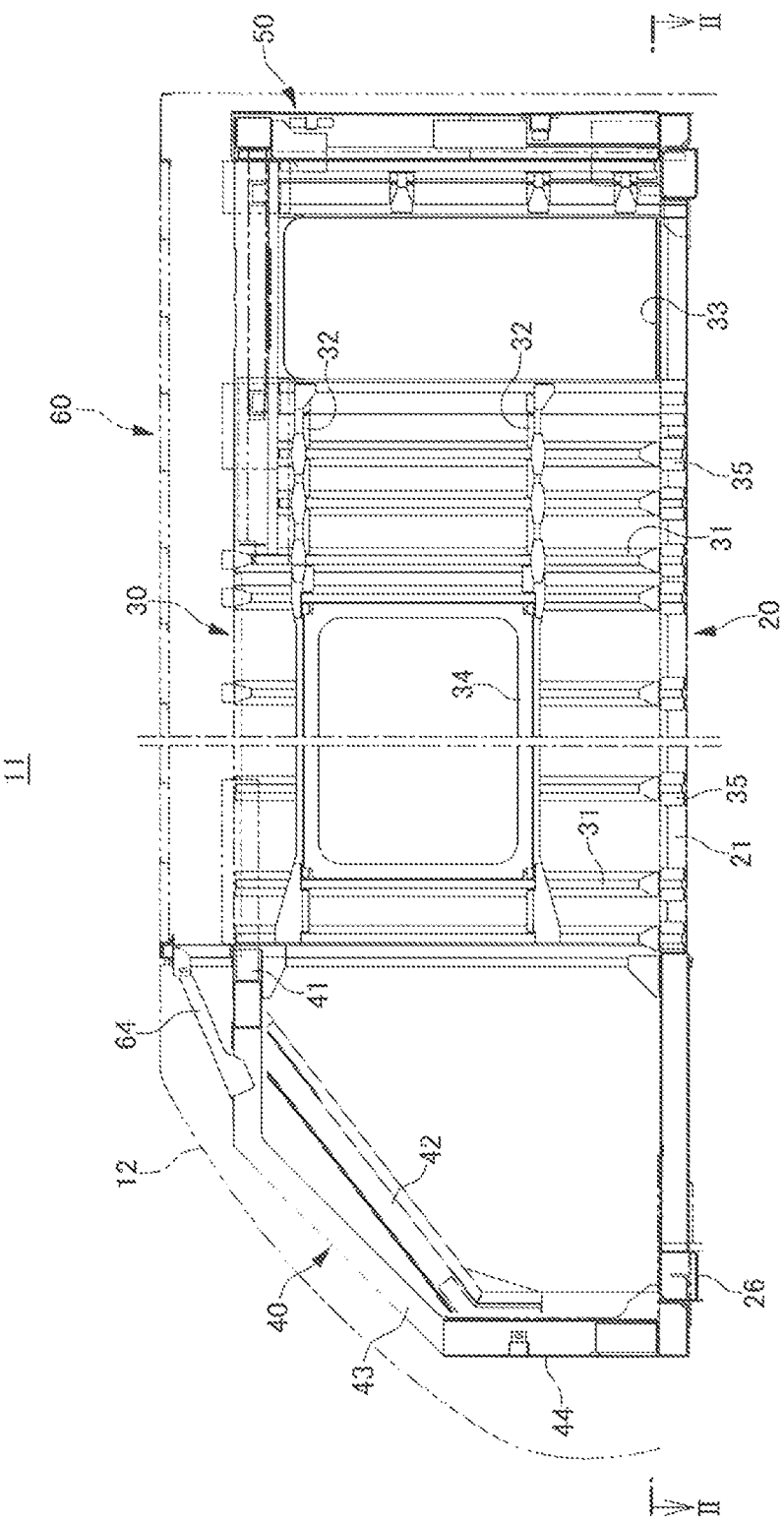
FIG. 1 is a side view of a rolling stock structure showing one embodiment of a rolling stock of the present invention.
Figure 2:
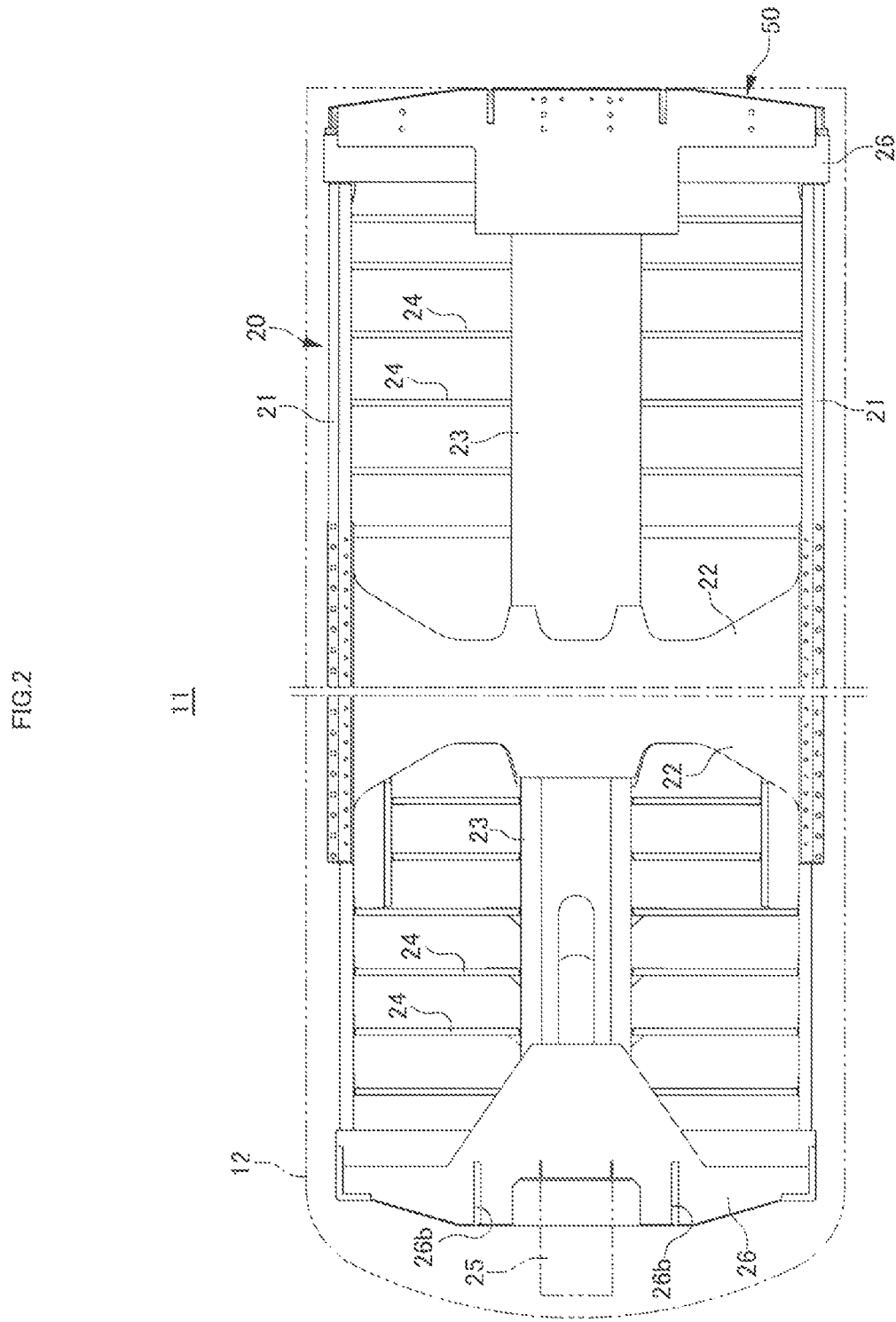
FIG. 2 is a cross-sectional view taken along the line II-II in FIG. 1.
Figure 3:
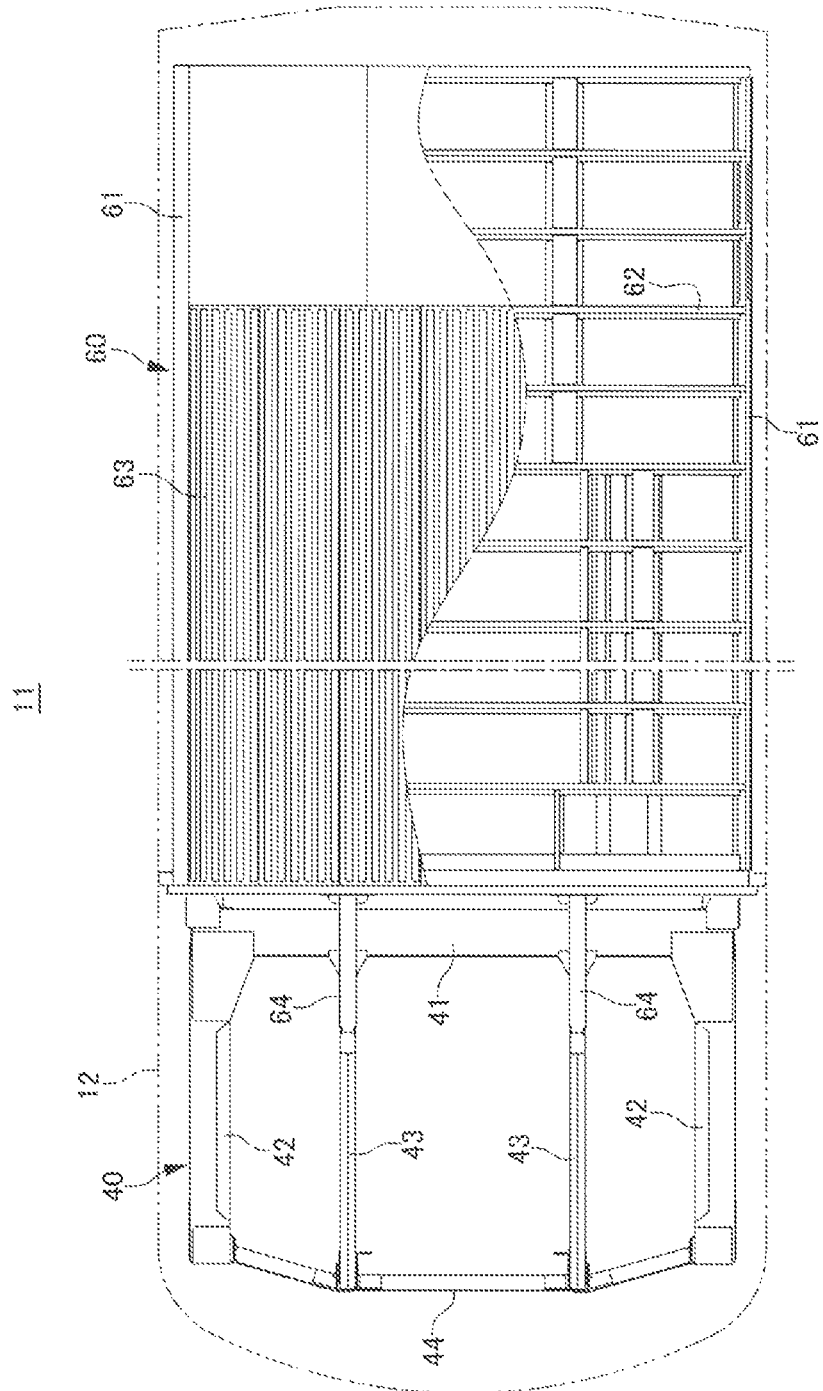
FIG. 3 is a partially cutout plan view of the rolling stock structure.

The embodiment shows a first rolling stock 10 having a streamlined shape in a front end of a car body. A rolling stock structure 11 forming the first rolling stock 10 includes: an underframe 20; a pair of left and right side structures 30 provided on the opposite sides of the underframe 20; a cab end structure 40 and an end structure 50 provided respectively on the opposite ends of the underframe 20 and the side structures 30; and a roof structure 60 provided to cover upper portions of the side structures 30, the cab end structure 40, and the end structure 50. The cab end structure 40 is formed in a streamlined shape in which an upper half portion is inclined rearward and the opposite side portions are inclined rearward.

The underframe 20 includes: a pair of left and right side beams 21 disposed in a rail direction (a front-rear direction of the car body); a pair of front and rear bolster beams 22 disposed in a railroad-tie direction (a width direction of the car body) near the front and rear end portions; center beams 23 provided in a center portion of the underframe 20 in parallel with the side beams 21; a plurality of cross beams 24 coupling the side beams 21 and the center beams 23 in the railroad-tie direction; end beams 26 provided respectively on leading ends of the center beams 23 on the car-body opposite end sides of the bolster beams 22. An impact absorbing part 25 is provided on an outer face of the end beam 26 on the head side.

The side structures 30 include: a plurality of side posts 31 extending in a vertical direction; a plurality of frame members 32 extending in the front-rear direction of the car body; door frame parts 33 forming gate opening portions; and window frame parts 34 forming side-window opening portions. Each of the side posts 31 is bent into a shape inclined toward the inside of the car body in a middle portion, to a lower portion thereof in the up-down direction so as to conform to a tapered shape of the first rolling stock 10. In addition, lower end portions of the side posts 31 are joined to outer faces of the corresponding side beams 21 on lower protruding pieces 21a protruding sideward from lower ends of the side beams 21 by means of joint members 35.

The cab end structure 40 has a driver's cabin provided in a center portion in the width direction of the car body. An upper reinforcement beam 41 extending in the railroad-tie direction is provided between joint portions of an upper end portion of a rear side of the cab end structure 40 and upper end portions of head sides of the side structures 30. A pair of left and right corner posts 42 are provided as post members in a front end portion of the cab end structure 40 in such a manner as to extend between the opposite end portions of the end beam 26 in the width direction and the opposite end portions of the upper reinforcement beam 41 in the width direction. A pair of left and right end posts 43 are provided at positions on the opposite sides of the driver's cabin, and on the inner sides of the corner posts 42, in such a manner as to extend between the end beam 26 and the upper reinforcement beam 41. Front face reinforcement panels 44 covering a lower half portion of the cab end structure 40 are provided between each corner post 42 and the corresponding end post 43 as well as between the end posts 43. The front face reinforcement panel 44 is formed of a vertical frame 44a, a horizontal frame 44b, and a front face panel 44c. A front window opening portion 45 is provided in an upper side of the front face reinforcement panel 44. On the other hand, the end structure 50 is formed in a flat-plate shape, and has a through-hole opening portion (not shown) provided in a center portion in the width direction.

The roof structure 60 is formed of: a pair of long girders 61 disposed respectively on the opposite sides in the rail direction; a plurality of rafters 62 extending in the railroad-tie direction, which are joined orthogonally to the long girders 61; and a roof board 63 joined to outer face sides of the rafters 62. The long girders 61 are joined to upper end portions of the side structures 30, and the rafters 62 on the front and rear ends are joined respectively to an upper end portion of the cab end structure 40 and an upper end portion of the end structure 50. In addition, a front end of the roof structure 60 and upper portions of the end posts 43 are coupled by coupling members 64.

Figure 4:
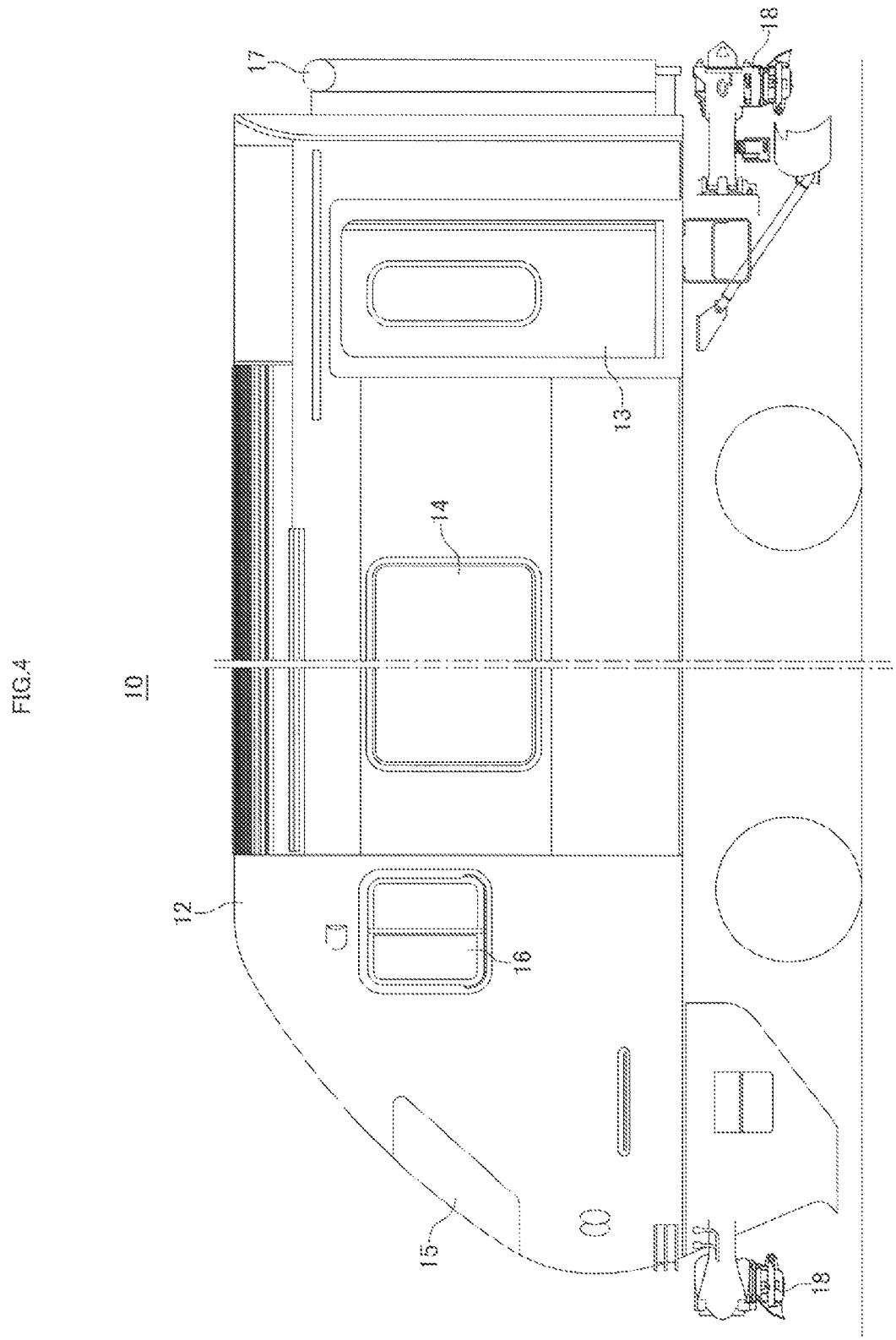
FIG. 4 is a side view showing one embodiment of the rolling stock of the present invention.
Figure 5:
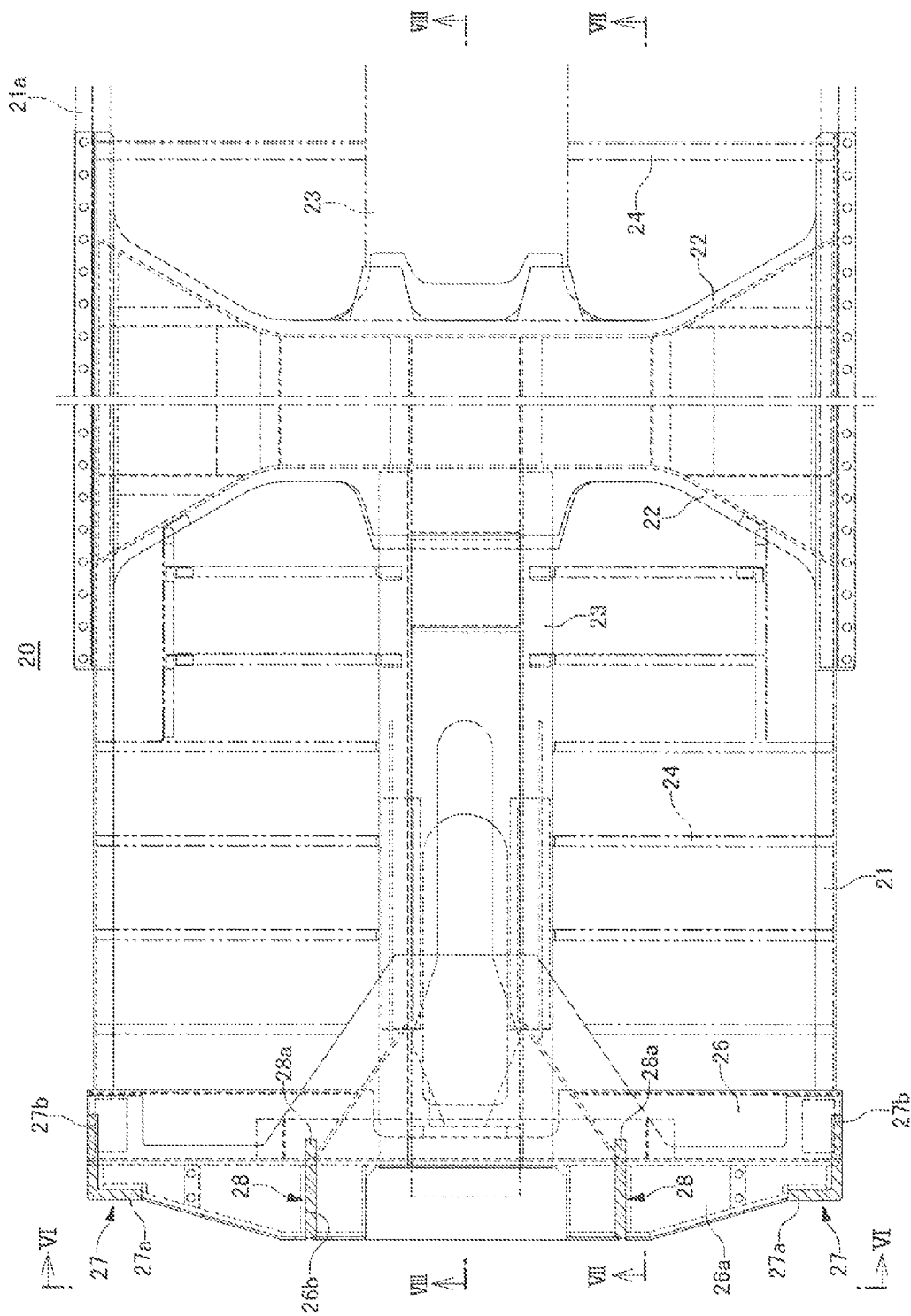
FIG. 5 is a plan view showing a main part of an underframe.
Figure 6:
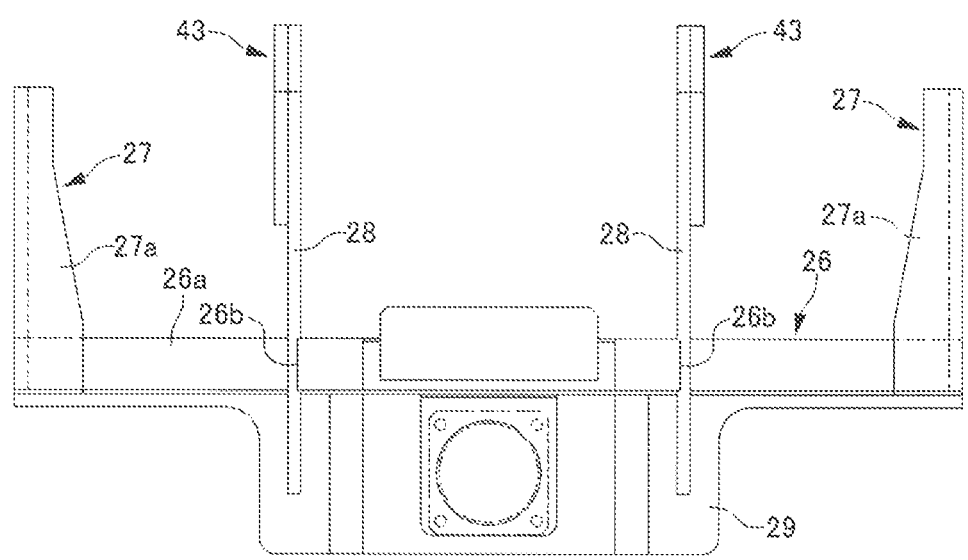
FIG. 6 is a view in the direction of the arrows VI-VI in FIG. 5.
Figure 7:
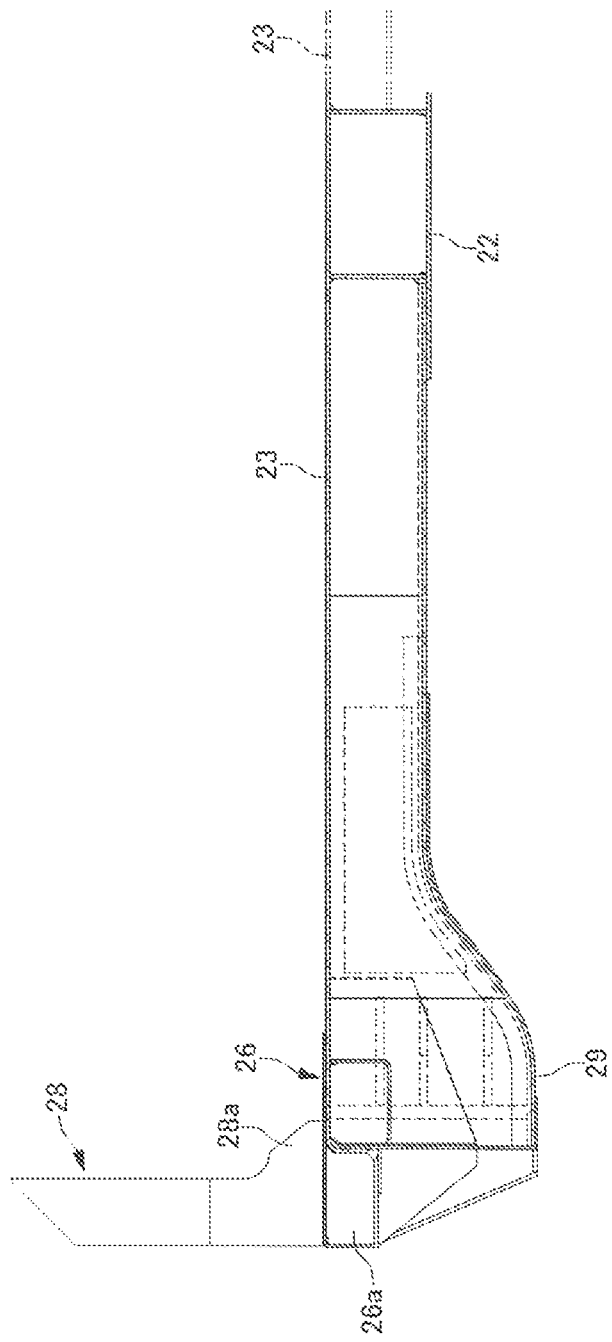
FIG. 7 is a cross-sectional view taken along the line VII-VII in FIG. 5.
Figure 8:
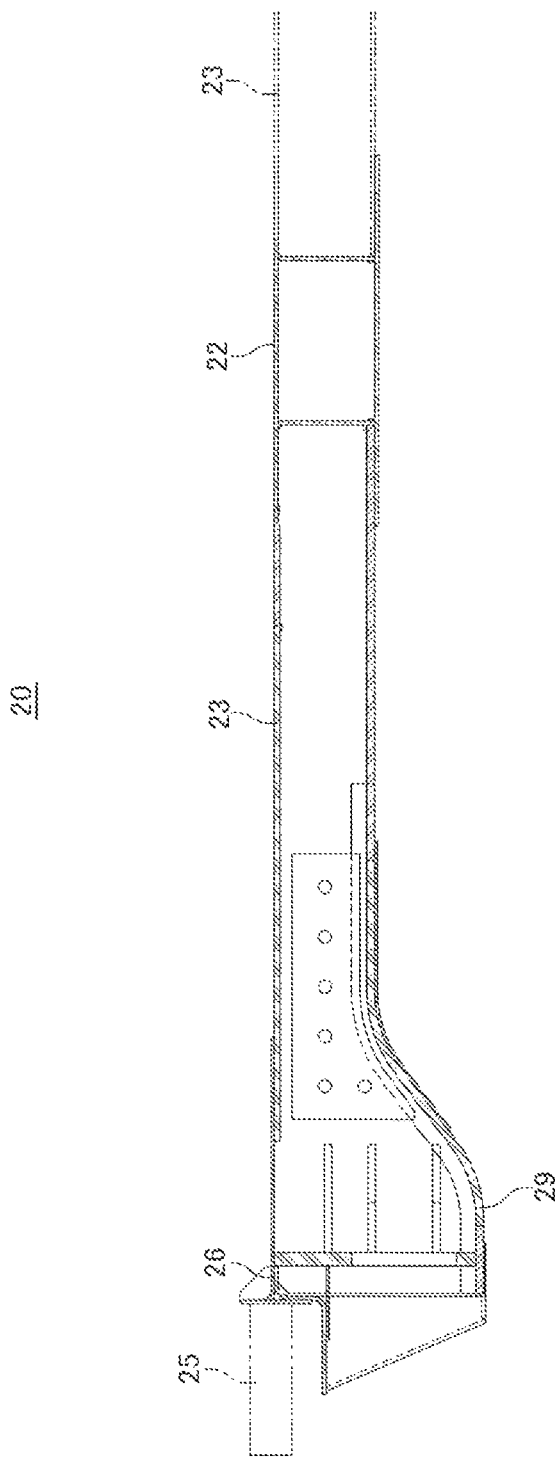
FIG. 8 is a cross-sectional view taken along the line VIII-VIII in FIG. 5.
Figure 9:
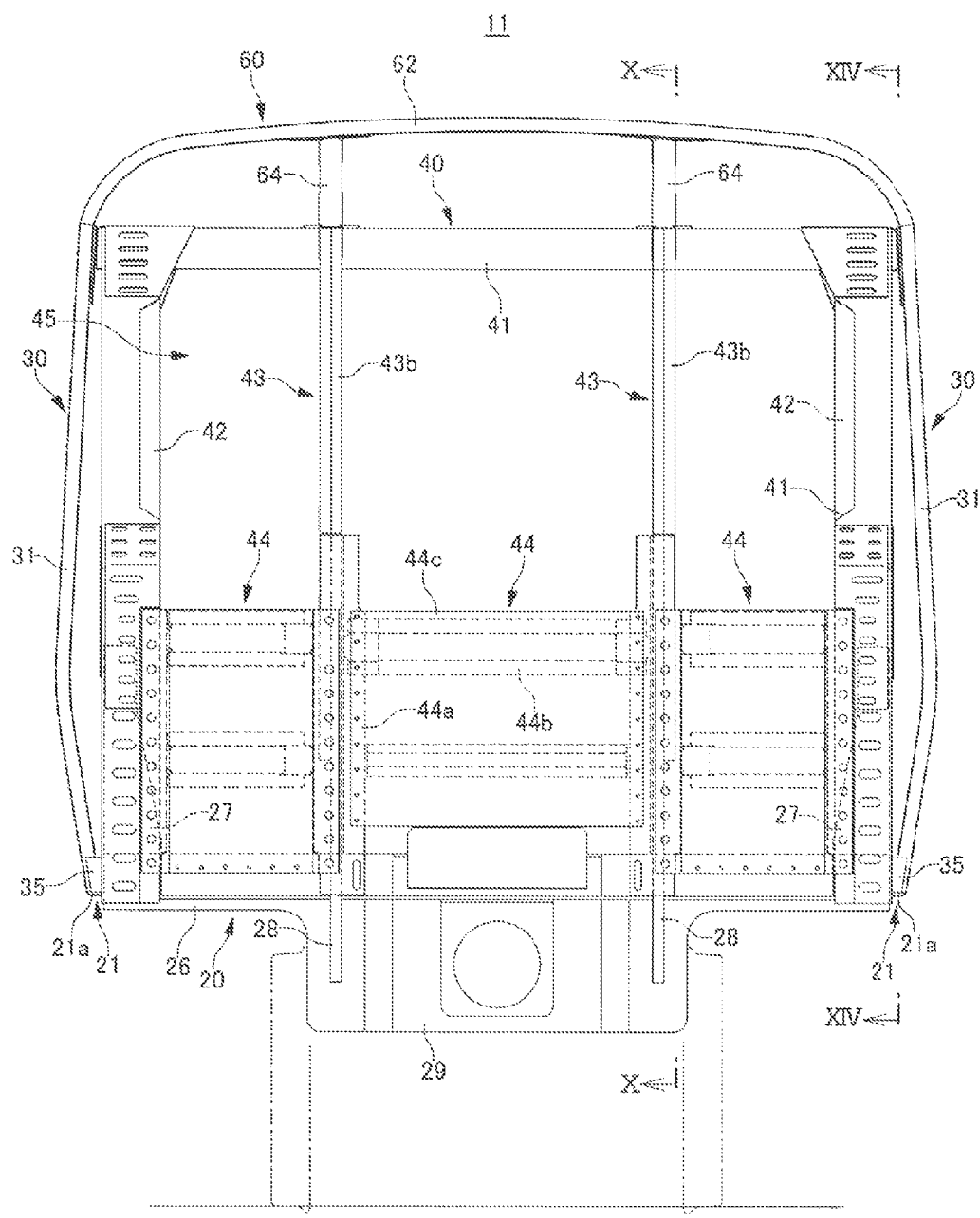
FIG. 9 is a front view of the rolling stock structure.
Figure 10:
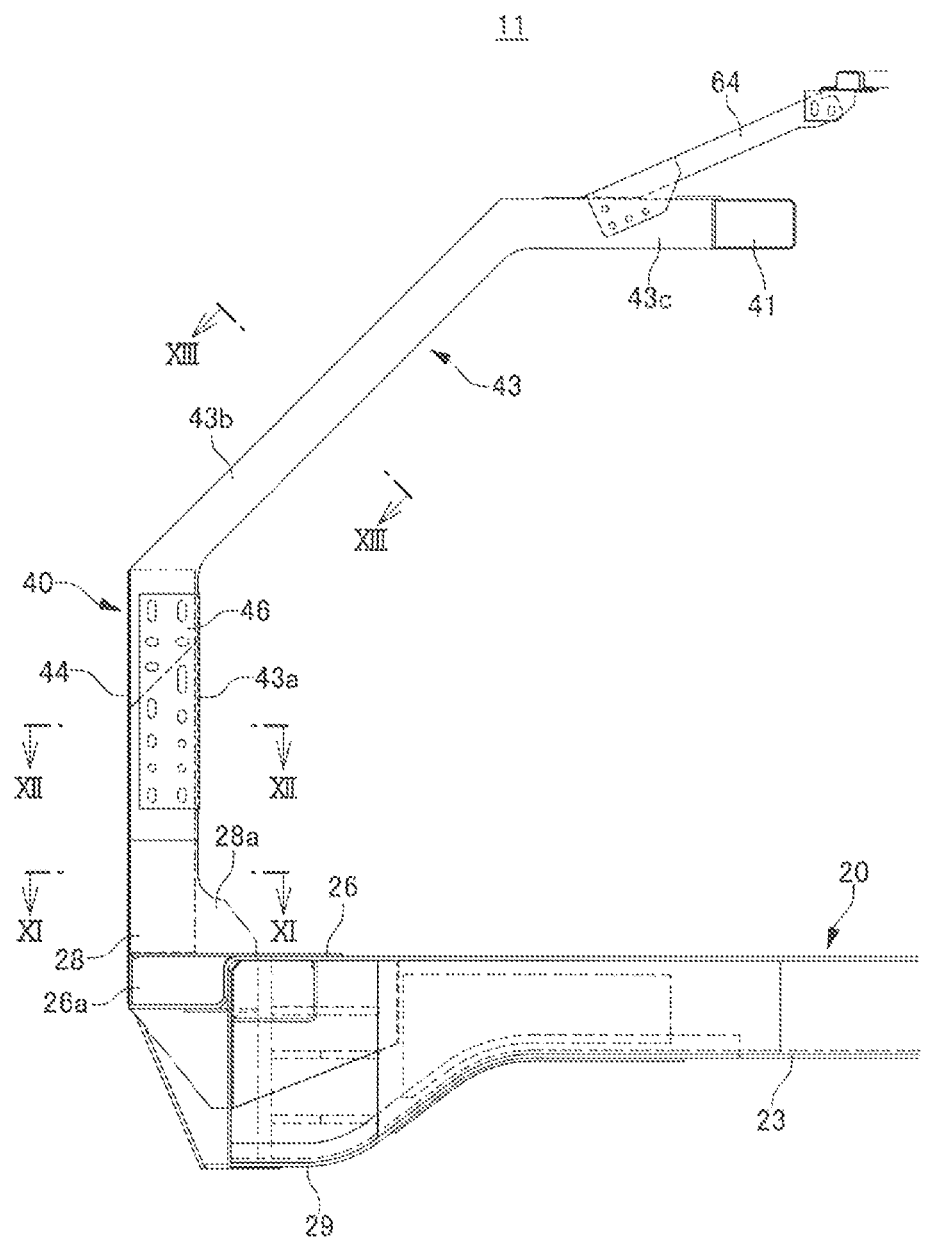
FIG. 10 is a cross-sectional view taken along the line X-X in FIG. 9.
Figure 11:
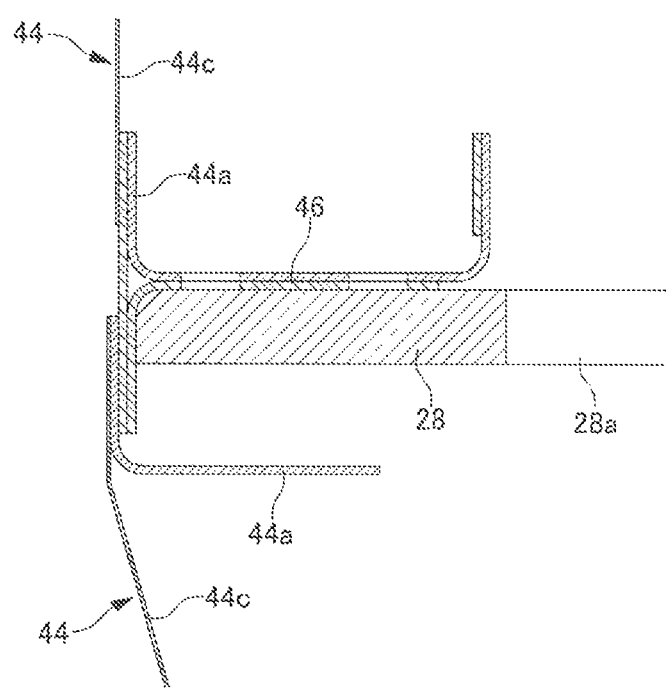
FIG. 11 is a cross-sectional view taken along the line XI-XI in FIG. 10.
Figure 12:
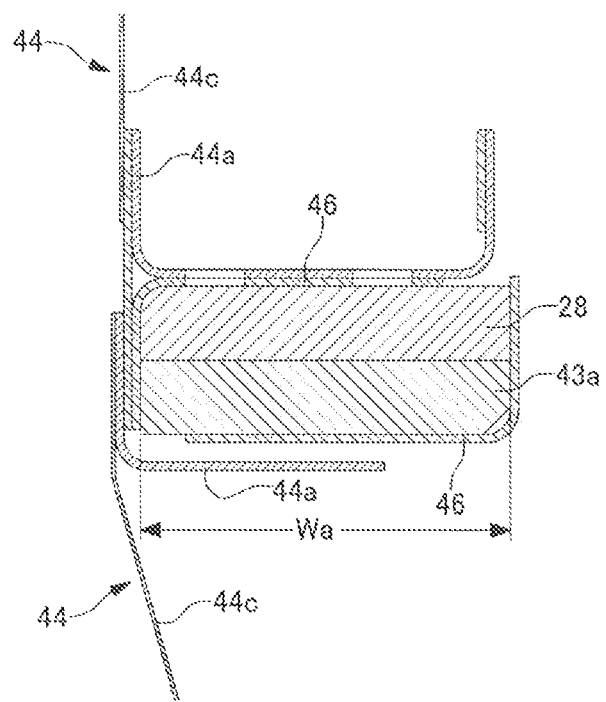
FIG. 12 is a cross-sectional view taken along the line XII-XII in FIG. 10.
Figure 13:
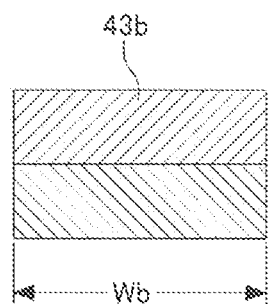
FIG. 13 is a cross-sectional view taken along the line XIII-XIII in FIG. 10.
Figure 14:
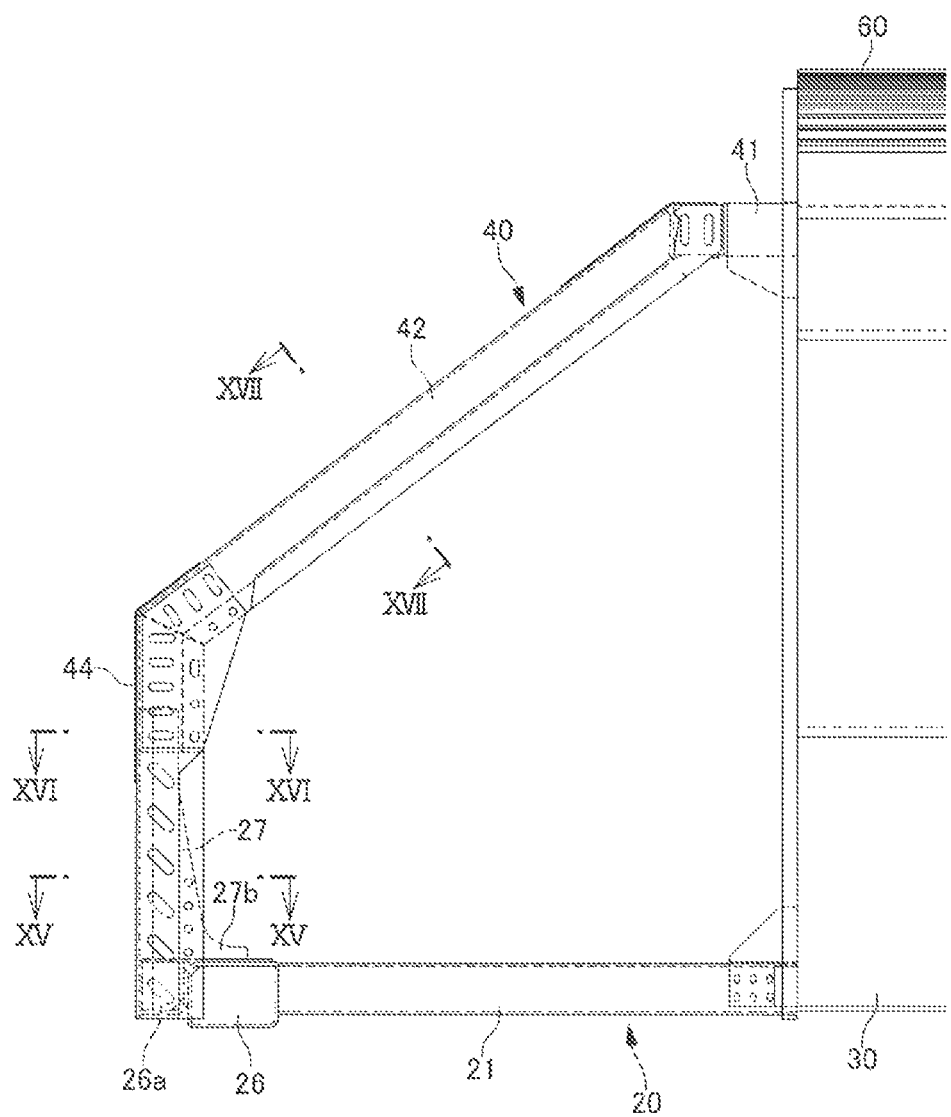
FIG. 14 is a cross-sectional view taken along the line XIV-XIV in FIG. 9.
Figure 15:
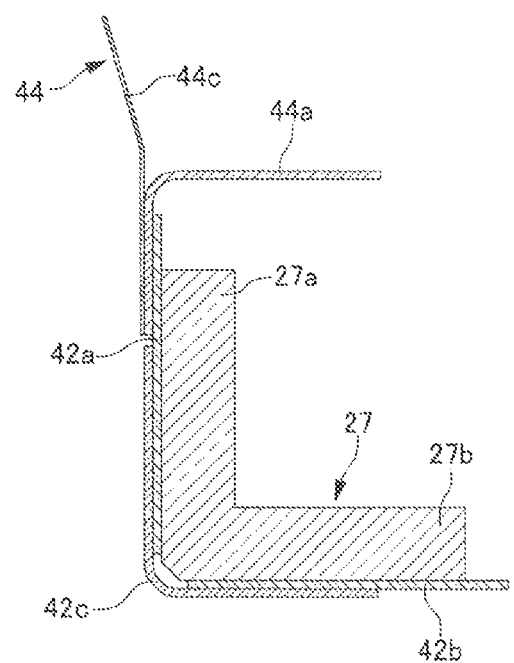
FIG. 15 is a cross-sectional view taken along the line XV-XV in FIG. 14.
Figure 16:
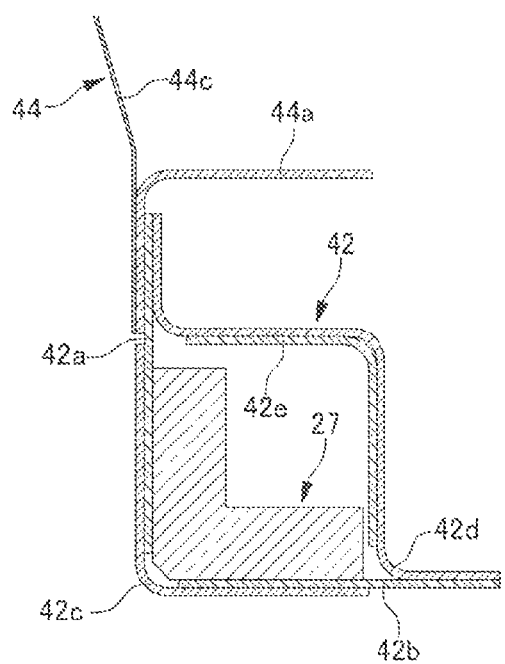
FIG. 16 is a cross-sectional view taken along the line XVI-XVI in FIG. 14.
Figure 17:
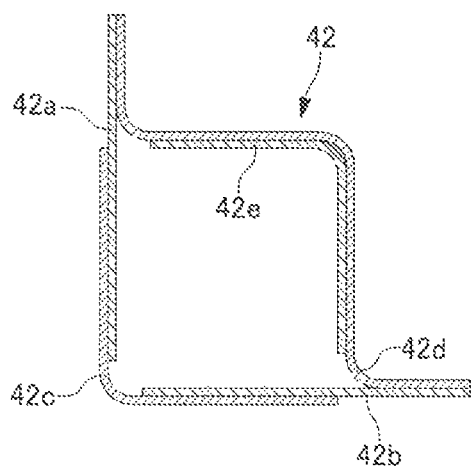
FIG. 17 is a cross-sectional view taken along the line XVII-XVII in FIG. 14.

As shown in FIG. 4, outside plates 12 having shapes corresponding to the corresponding structures are attached to outer sides of the structures, and rigs and interior decorations, including various instruments and seats, are provided inside and outside the structures. In addition, a passenger door 13 is provided in the door frame part 33 and a side window 14 is provided in the window frame part 34. A front window 15 is provided in a middle portion of the front face of the cab end structure 40 in the up-down direction, and a crew window 16 is provided in a side face of the cab end structure 40. A coupling hood 17 is provided around the through-hole opening portion of the end structure 50. Moreover, couplers 18 are provided respectively on lower portions of the opposite ends of the car body. By mounting required components such as the outside plate 12 inside and outside the rolling stock structure 11 as described above, the streamlined first rolling stock 10 with a rounded head portion having the driver's cabin at the center in the width direction is formed.

As shown in FIGS. 5 to 8, a pair of left and right corner post reinforcement members 27 for reinforcing the lower portions of the corner posts 42 provided in the cab end structure 40 and a pair of end reinforcement posts 28 joined to the lower portions of the end posts 43 are provided on the end beam 26 in the end portion of the underframe 20 on the cab end structure side. In addition, a coupler support frame 29 is provided on a lower portion of the end beam 26.

Each of the end reinforcement posts 28 has a rectangular cross-section long in the front-rear direction in order to withstand impact from the front. A lower portion of each end reinforcement post 28 is passed through a slit 26b, which is provided in a reinforcement frame 26a projecting frontward from the end beam 26, and is joined across the front face of the end beam 26 and the front face of the coupler support frame 29. Further, reinforcement projecting portions 28a, which are joined to an upper face of the end beam 26, are provided in rear portions of the end reinforcement posts 28. In addition, each of the corner post reinforcement members 27 is formed in an L-shaped cross-section. Reinforcement projecting portions 27a and 27b, which project toward the rear side of the car body and the inside of the car body and are joined to the upper face of the end beam 26 and an upper face of the reinforcement frame 26a, are provided respectively on lower portions of the corner post reinforcement members 27.

Moreover, as shown in FIGS. 9 to 17, the end posts 43 are joined to the end reinforcement posts 28, and the corner posts 42 are joined to the corner post reinforcement members 27, as post members provided on the front end of the cab end structure 40. Each of the end posts 43 is formed of a solid material made of steel, and includes: a lower post portion 43a, which extends in the vertical direction and is joined to the end reinforcement post 28; a window opening post portion 43b, which is located on an inner side of the front window 15; and an upper post portion 43c, which extends in the horizontal direction and has a rear end joined to the upper reinforcement beam 41.

Each of the lower post portions 43a has a rectangular cross-section long in the front-rear direction in the same manner as the end reinforcement posts 28 to withstand impact from the front like the end reinforcement posts 28. The lower post portion 43a is joined in a state of being placed over a side face of an upper half portion of the end reinforcement post with two splice members 46, each having an L-shaped cross-section, arranged around the lower post portion 43a. The lower post portion 43a is thus joined to the end beam 26 with the end reinforcement post 28 in between. The front face reinforcement panel 44 is attached to an outer side of the end reinforcement post 28 and the lower post portion 43a.

Each of the window opening post portions 43b is provided to extend from an upper end of the lower post portion 43a while an upper portion of the window opening post portion 43b is inclined toward the rear of the car body in conformity with the inclination of the front window 15. The window opening post portion 43b is formed to have a smaller width dimension Wb in the rail direction (the front-rear direction) than the width dimension Wa of the lower post portion 43a in the rail direction. In addition, in the embodiment, a single window opening post portion 43b is formed by laminating two plate materials having the same thickness as that of the end reinforcement post 28 and the lower post portion 43a. Each of the upper post portions 43c extends from the rear upper end portion of the window opening post portion 43b toward the upper reinforcement beam 41 in the horizontal direction. The upper post portion 43c has the same cross-sectional shape as that of the window opening post portion 43b.

Each of the corner posts 42 is formed by combining and joining: a front face member 42a, which is disposed on a front face of the corner post reinforcement member 27; a side face member 42b, which is disposed on an outer side face of the corner post reinforcement member 27; an outer face member 42c, which has an L-shaped cross-section and joins an outer edge of the front face member 42a and a front edge of the side face member 42b on an outer side; an inner face member 42d, which has a W-shaped cross-section and joins an inner edge of the front face member 42a and a rear edge of the side face member 42b on an inner side in such a manner as to cover an inner side of the corner post reinforcement member 27; and an inside reinforcement member 42e, which has an L-shaped cross-section and is disposed on the corner post reinforcement member side of the inner face member 42d. The corner post 42 is also provided such that an upper portion of a portion thereof located on the inner side of the front window 15 is inclined toward the rear of the car body in conformity with the inclination of the front window 15. The front face reinforcement panel 44 is attached to a front face of a lower portion of the corner posts 42 as extending to a front face of a lower portion of the end posts 43.

In this way, in the rolling stock 10 having the streamlined shape provided with the driver's cabin in the center portion in the width direction of the car body, the window opening post portions 43b, which are provided on the front end portion of the cab end structure 40 and are located respectively on the opposite sides of the driver's cabin in the front window 15, are each formed to have a smaller width dimension in the rail direction. This eliminates the possibility that the driver's view through the front window 15 is largely obstructed by the window opening post portions 43b, and thus makes it possible to achieve a favorable state of the driver's view during the operation. In addition, joining the lower ends of the end posts 43 to the front face of the end beam 26 and joining the upper ends of the end posts 43 to the front faces of the upper reinforcement beams 41 makes it possible to receive the load applied to the end posts 43 from the front side by means of the end beam 26 and the upper reinforcement beam 41, and to protect the driver's cabin from impact from the outside.

Moreover, forming the end posts 43 including the window opening post portions 43b from solid members makes it possible to obtain sufficient strength even when the window opening post portions 43b have small cross-sectional dimensions. In particular, integrating the lower portions of the end posts 43, which become the front end of the rolling stock, with the end reinforcement posts 28 firmly joined to the end beam 26 makes it possible to further improve the strength of the end posts 43.

In addition, when the driver's cabin is provided in the center portion in the width direction of the car body, the end posts 43 are located on the left and right sides in front of the driver's cabin. Accordingly, forming the window opening post portions 43b with a small width dimension in the rail direction makes it possible to achieve a favorable state of the driver's view. Moreover, when the end posts 43 are disposed on the inner sides of the corner posts 42 on the opposite ends, the interval between the end posts becomes narrow. In this case, if the window opening post portions 43b have a large width dimension in the rail direction, the driver's view is largely obstructed. Against this, forming the window opening post portions 43b with a small width dimension in the rail direction makes it possible to achieve a favorable state of the driver's view even when the interval between the end posts is small.

Note that, the driver's cabin is not limited to one located in the completely center portion in the width direction of the car body, but may be one located on one side of the center portion. Moreover, the post member can be formed by using a single member continuously from the end beam to the upper reinforcement beam without laminating two plate materials. In addition, welding portions of the members may be provided with welding holes as necessary.

EXPLANATION OF THE REFERENCE NUMERALS 10 first rolling stock
11 rolling stock structure
12 outside plate
13 passenger door
14 side window
15 front window
16 crew window
17 coupling hood
18 coupler
20 underframe
21 side beam
21a lower protruding piece 22 bolster beam
23 center beam
24 cross beam
25 impact absorbing part
26 end beam
26a reinforcement frame
26b slit
27 corner post reinforcement member
27a, 27b reinforcement projecting portion
28 end reinforcement post
28a reinforcement projecting portion
29 coupler support frame
30 side structure
31 side post
32 frame member
33 door frame portion
34 window frame portion
35 joint member
40 cab end structure
41 upper reinforcement beam
42 corner post
42a front face member
42b side face member
42c outer face member
42d inner face member
42e inside reinforcement member
43 end post
43a lower post portion
43b window opening post portion
43c upper post portion
44 front face reinforcement panel
44a vertical frame
44b horizontal frame
44c front face panel
45 front window opening portion
46 splice member
50 end structure
60 roof structure
61 long girder
62 rafter
63 roof board
64 coupling member

The invention claimed is:

1. A rolling stock having a car body formed by joining a cab end structure having a streamlined shape and an end structure respectively to opposite ends of an underframe, side structures, and a roof structure, the rolling stock comprising:

an upper reinforcement beam provided in a railroad-tie direction between joint portions of an upper end portion of the cab end structure and upper end portions of the side structures; and post members coupling the upper reinforcement beam and an end beam of the underframe, wherein each of the post members includes: a lower post portion having a lower end joined to a reinforcement post provided on the end beam; an upper post portion having a rear end joined to the upper reinforcement beam; and a window opening post portion provided between an upper end portion of the lower post portion and a lower end portion of the upper post portion in an inclined manner to conform to an inclination of a front window provided in the cab end structure, the reinforcement post and the lower post portion are formed from plate materials having the same thickness, the window opening post portion is formed by laminating two plate materials having the same thickness as that of the reinforcement post and the lower post portion, and the window opening post portion is formed to have a smaller width dimension in a rail direction than a width dimension of the lower post portion in the rail direction.

2. The rolling stock according to claim 1, wherein each post member is formed from a solid member.

3. The rolling stock according to claim 2, wherein the cab end structure is provided with a driver's cabin in a center portion in a width direction of the car body, and is provided with a pair of corner posts respectively in opposite end portions in the width direction of the car body, and the post members are a pair of end posts provided in opposite side portions of the driver's cabin, and on inner sides of the car body relative to the corner posts.

4. The rolling stock according to claim 3, wherein each post member has a lower end portion joined to a front face of the end beam and has an upper end portion joined to a front face of the upper reinforcement beam.

5. The rolling stock according to claim 1, wherein the cab end structure is provided with a driver's cabin in a center portion in a width direction of the car body, and is provided with a pair of corner posts respectively in opposite end portions in the width direction of the car body, and the post members are a pair of end posts provided in opposite side portions of the driver's cabin, and on inner sides of the car body relative to the corner posts.

6. The rolling stock according to claim 2, wherein each post member has a lower end portion joined to a front face of the end beam and has an upper end portion joined to a front face of the upper reinforcement beam.

7. The rolling stock according to claim 5, wherein each post member has a lower end portion joined to a front face of the end beam and has an upper end portion joined to a front face of the upper reinforcement beam.

8. The rolling stock according to claim 1, wherein each post member has a lower end portion joined to a front face of the end beam and has an upper end portion joined to a front face of the upper reinforcement beam.

* * * * *